Dec. 29, 1925.  S. R. MARTIN  1,567,665

RADIUS ROD SUPPORT

Filed March 16, 1925

INVENTOR.
S. R. Martin
BY
Geo. F. Kimmel
ATTORNEY.

Patented Dec. 29, 1925.

1,567,665

UNITED STATES PATENT OFFICE.

SHELLMAN R. MARTIN, OF WRIGHTSVILLE, GEORGIA.

RADIUS-ROD SUPPORT.

Application filed March 16, 1925. Serial No. 15,814.

*To all whom it may concern:*

Be it known that I, SHELLMAN R. MARTIN, a citizen of the United States, residing at Wrightsville, in the county of Johnson and State of Georgia, have invented certain new and useful Improvements in Radius-Rod Supports, of which the following is a specification.

This invention relates to supporting devices and pertains particularly to a device adapted to be used upon automobiles for supporting the radius rods.

The primary object of this invention is the provision, in the manner as hereinafter set forth, of a safety supporting device for engagement with the radius rods of automobiles to prevent the same from dropping and causing serious accidents, in the event that the secured ends of the rods become loosened through the breakage of the connecting bolt or the accidental displacement of the securing nut.

Another object of the invention is the provision, of a supporting device for connection with a radius rod, which may be taken up to hold the radius rod securely in position to prevent the same from rattling in the event the connecting means become loosened, or to prevent the falling of the rod in the event the connecting means fail.

A further and final object of the invention is the provision, in the manner as hereinafter set forth, of a device of the type and for the purpose above set forth, which will be strong and durable in position and easily adjusted and inexpensive to manufacture.

The invention will be best understood from a consideration of the following detailed description, taken in connection with the accompanying drawing forming a part of this specification, with the understanding that the invention is not confined to any strict conformity with the showing of the drawing, but may be changed and modified so long as such changes and modifications mark no material departure from the salient features of the invention as expressed in the appended claims.

Figure 1:
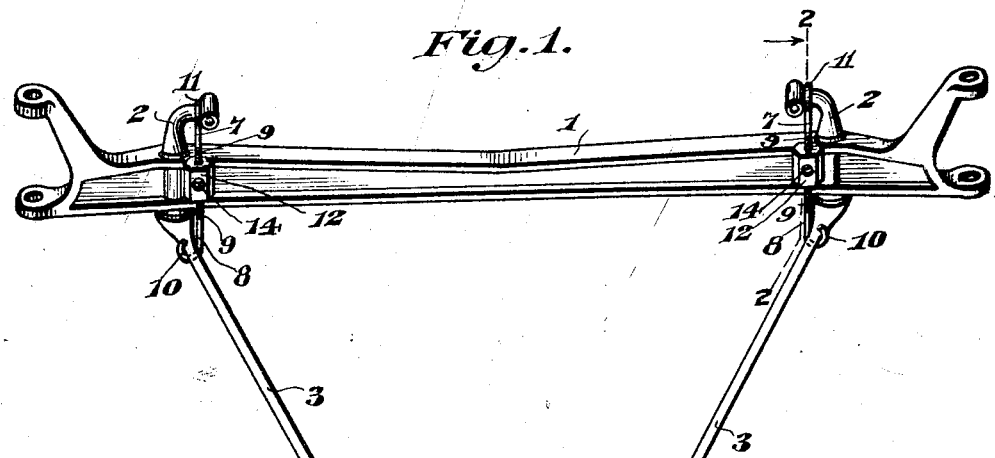
Fig. 1 is a perspective view of the front axle of an automobile and of the front radius rod which is connected to the axle, showing the device embodying this invention as applied and used.
Figure 2:
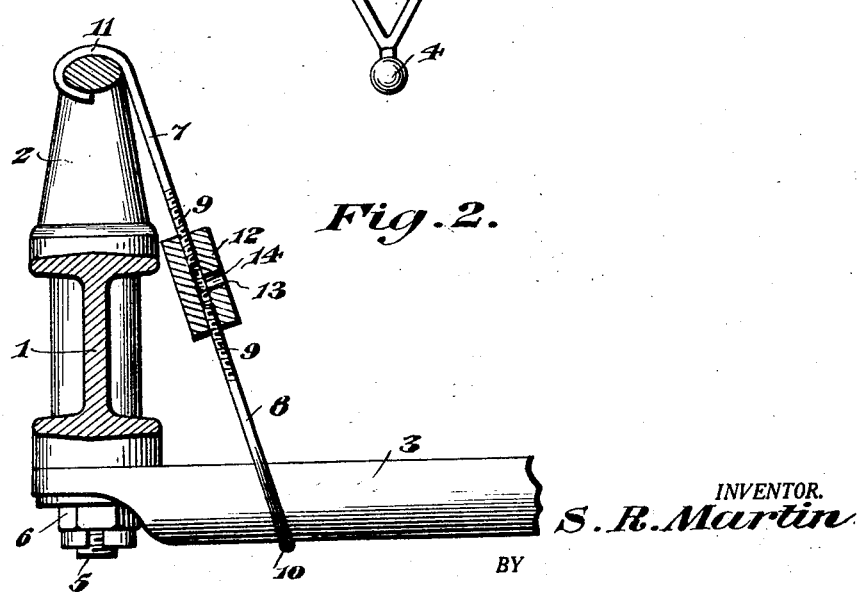
Fig. 2 is a section taken upon the line 2—2 of Figure 1.

Referring now to the drawing in detail wherein like numerals of reference indicate corresponding parts throughout the several views, the numeral 1 indicates the front axle of an automobile of well known construction, having the usual spring perches 2 carried thereon, to which the spring (not shown) is attached.

Secured against the underside of the axle 1 directly beneath each of the spring perches 2 is one end of a radius rod 3, the two radius rods adjoining at their rear ends and terminating in the ball 4, all of which is of usual construction. The forward ends of the radius rods 3 are secured against the under side of the axle 1, upon the bolt 5 by the nut 6.

The device embodying this invention comprises a coupling or supporting rod formed in two parts 7 and 8 respectively, the ends of the parts being in opposed relation as shown, and these opposed ends are threaded as at 9 while the opposite or remote ends of the two members are hooked as at 10 and 11 respectively, the hook 10 being engaged about a radius rod 3 adjacent its forward end and the hook 11 is engaged over the neck of the superposed spring perch 2.

The opposed threaded ends 9 and the members 7 and 8 are held in this end opposed relation by means of the elongated nut 12 which has a central longitudinal bore 13 therethrough, internally threaded to take the threaded ends 9. The members 7 and 8 have the screw threads 9 cut one opposite to the other as shown or in other words the threads 9 upon one member are right hand threads, while those upon the other member are left hand threads and the bore 13 through the nut 12 is accordingly threaded. At the central portion of the nut 12 a transverse bore 14 is formed which extends into the longitudinal bore 13 and this bore 14 is to allow for the insertion of an instrument to turn the nut to cause the threaded ends 9 to be drawn together in the nut and thus tighten up upon the radius rod 3 to hold the end of the same securely against the underside of the axle 1.

From the foregoing description it will be seen that there has been provided an unique and serviceable support and brace for the radius rods 3, preventing the same from falling to the ground in the event that they become disconnected through any cause whatever.

Having thus described my invention what I claim is:—

1. A radius rod support of the character set forth, comprising a two part coupling rod having means for engaging one end of one part under a radius rod and one end of the other part over a spring perch, and means connecting the said two parts and adapted to draw the same together.

2. A radius rod support of the character set forth, comprising a coupling rod formed in two parts, arranged in end opposed relation, the remote ends of said parts being hooked one for engagement over a spring perch and the other for engagement under a radius rod, and a tightening nut having said opposed ends threaded thereinto for drawing the ends together when the nut is turned thereon, to retain the engaging radius rod securely against the underside of an axle to which it is attached at its forward end.

In testimony whereof, I affix my signature hereto.

SHELLMAN R. MARTIN.